(12) United States Patent
Khajornrungruang et al.

(10) Patent No.: US 8,755,055 B2
(45) Date of Patent: Jun. 17, 2014

(54) SYSTEM AND METHOD FOR MEASURING LENGTH OF GAP BETWEEN ROTATING TOOL AND WORKPIECE

(75) Inventors: Panart Khajornrungruang, Kitakyushu (JP); Keiichi Kimura, Kitakyushu (JP)

(73) Assignee: Kyushu Institute of Technology, Fukuoka (JP)

( * ) Notice: Subject to any disclaimer, the term of this patent is extended or adjusted under 35 U.S.C. 154(b) by 0 days.

(21) Appl. No.: 13/812,319

(22) PCT Filed: Jun. 23, 2011

(86) PCT No.: PCT/JP2011/064410
§ 371 (c)(1),
(2), (4) Date: Jan. 25, 2013

(87) PCT Pub. No.: WO2012/014609
PCT Pub. Date: Feb. 2, 2012

(65) Prior Publication Data
US 2013/0128285 A1    May 23, 2013

(30) Foreign Application Priority Data
Jul. 29, 2010   (JP) .................... 2010-170670

(51) Int. Cl.
*G01B 11/04* (2006.01)
*G01B 11/14* (2006.01)
*B23Q 17/00* (2006.01)
*B23Q 17/22* (2006.01)

(52) U.S. Cl.
CPC .............. *G01B 11/043* (2013.01); *G01B 11/14* (2013.01); *B23Q 17/2233* (2013.01)
USPC ............. 356/634; 356/635; 29/407.1; 29/468

(58) Field of Classification Search
CPC ... G01B 11/043; G01B 11/14; B23Q 17/2233
USPC ......... 356/625, 630, 634, 635, 636; 29/407.1, 29/468
See application file for complete search history.

(56) References Cited

U.S. PATENT DOCUMENTS 3,793,524 A * 2/1974 Howarth ..................... 250/339.1
3,797,939 A * 3/1974 Pryor ............................ 356/505
4,195,446 A * 4/1980 Angst ........................... 451/253

(Continued)

FOREIGN PATENT DOCUMENTS

JP    57-23204 B2    5/1982
JP    59170710 A *   9/1984

(Continued)

*Primary Examiner* — Sang Nguyen
(74) *Attorney, Agent, or Firm* — McGlew and Tuttle, P.C.

(57) ABSTRACT

The present invention is to generate a pulsed laser beam having a width greater than the gap between a rotating tool and a workpiece opposed thereto, and then irradiate the gap with the generated laser beam while the optical axis thereof is tilted relative to a workpiece plane. The pulsed laser beam has one lased-pulse period per one revolution or an integer number of revolutions of the rotating tool and is directed in the same angle range relative to the rotating tool within the ON durations of the lased pulse. The light which has irradiated the gap and has not been interrupted but diffracted by the gap is detected on a light-receiving sensor to measure the length of the gap.

7 Claims, 6 Drawing Sheets

(56) References Cited

U.S. PATENT DOCUMENTS

| | | | | |
|---|---|---|---|---|
| 4,498,776 | A | * | 2/1985 | Smith .......................... 356/623 |
| 4,666,303 | A | * | 5/1987 | Pryor .......................... 356/606 |
| 4,821,544 | A | * | 4/1989 | Tamler et al. ................. 72/14.1 |
| 4,988,201 | A | * | 1/1991 | Sugitani et al. .............. 356/601 |
| 5,129,010 | A | * | 7/1992 | Higuchi et al. .............. 382/154 |
| 5,179,863 | A | * | 1/1993 | Uchida et al. ............... 73/865.8 |
| 5,206,703 | A | * | 4/1993 | Holmes et al. ............... 356/625 |
| 5,329,458 | A | * | 7/1994 | Unno et al. .................. 700/195 |
| 5,416,590 | A | * | 5/1995 | Stover et al. ................. 356/623 |
| 6,292,262 | B1 | * | 9/2001 | Ciani et al. .................. 356/505 |
| 7,746,483 | B2 | * | 6/2010 | Tassakos et al. ............. 356/614 |
| 2007/0229853 | A1 | | 10/2007 | Cheng |

FOREIGN PATENT DOCUMENTS

| | | | |
|---|---|---|---|
| JP | 60014106 A | * | 1/1985 |
| JP | 4-299204 A | | 10/1992 |
| JP | 2001-153618 A | | 6/2001 |
| JP | 2003-121123 A | | 4/2003 |
| JP | 2007-232489 A | | 9/2007 |
| JP | 2007-260900 A | | 10/2007 |
| JP | 2008-304292 A | | 12/2008 |
| JP | 2009-178818 A | | 8/2009 |

* cited by examiner

| Tool-Workpiece Distance: x (μm) | Angle of Diffraction: (θ) (degrees) |
|---|---|
| 10 | 13.0 |
| 20 | 6.5 |
| 30 | 4.3 |
| 40 | 3.2 |
| 50 | 2.6 |
| 60 | 2.2 |
| 70 | 1.8 |
| 80 | 1.6 |
| 90 | 1.4 |
| 100 | 1.3 |
| 110 | 1.2 |
| 120 | 1.1 |
| 130 | 1.0 |
| 140 | 0.9 |
| 150 | 0.9 |
| 160 | 0.8 |
| 170 | 0.8 |
| 180 | 0.7 |
| 190 | 0.7 |
| 200 | 0.6 |
| 210 | 0.6 |
| 220 | 0.6 |
| 230 | 0.6 |

| Diffraction Order Light | Coefficient of Diffraction Order Light: (β) |
|---|---|
| First-Order Diffracted Light | 1.430 |
| Second-Order Diffracted Light | 2.459 |
| Third-Order Diffracted Light | 3.471 |
| Fourth-Order Diffracted Light | 4.479 |

SYSTEM AND METHOD FOR MEASURING LENGTH OF GAP BETWEEN ROTATING TOOL AND WORKPIECE

TECHNICAL FIELD

This application is a 371 of PCT/JP2011/064410 Jun. 23, 2011.

The present invention relates to a system and a method for measuring a length of a gap between a rotating tool and a workpiece in an ultra-precision cutting and grinding process for manufacturing a metal mold of a fine electronic component or an opto-mechatronics component.

BACKGROUND ART

In the leading-edge technologies of recent precision fine die and mold machining, sub-micron machining accuracy has been achieved by using highly accurate machining centers. For the purpose of enhancement of machining accuracy and productivity efficiency, such a technique has been required that measures a tedious and time-consuming tool setting (a gap between a tip end of a tool that is rotating at a high speed and a workpiece) with sub-micron accuracy. Currently, fine machining is carried out by using a small-diameter tool of a machine tool such as a machining center with high accuracy. For the enhancement of the machining accuracy, machining accuracy and machining efficiency may be significantly affected by not only precision of a machine tool but also information regarding a cut-lip end (cutting edge) of the tool on the machine that is important information for determining a position of the tool relative to the workpiece and its in-feed rate. Unfortunately, measurement accuracy handled in an optical non-contact and on-machine tool measurement method that is commercially available is approximately several microns due to the diffraction phenomenon of an emitted light, and this is insufficient for tool measurement with sub-micron measurement accuracy.

In conventional on-machine tool measurement methods, a tool is irradiated with a laser beam, and a light diffracted from the tool is detected, so as to measure a diameter and a cut-lip shape of the tool. If the tool is rotating at a high speed, the frame rate of a camera for acquiring the diffracted light cannot catch up with the rotational speed, which makes the measurement difficult (see Patent Documents 1, 3). Conventional methods using the diffracted light require a reference knife-edge, so that it is necessary to find a relative distance between the reference knife-edge and a workpiece with high accuracy (see Patent Documents 2, 4).

FIG. 9 is a drawing explaining a measurement principle of the optical diffraction method (see Patent Documents 2, 4). As shown in the drawings, a light diffraction phenomenon occurs if a fine gap x between a small-diameter tool that is a measurement target and a reference knife-edge is irradiated with a line laser beam. The diffracted light is concentrated by a Fourier transformer lens, and at the same time, a diffraction pattern is acquired on a focal plane located at a focal distance f by using a camera or the like. Peaks $w_{-1}$, $w_{+1}$ are then detected that are first-order diffracted lights, a distance between the peaks is measured as w, and the fine gap x between the cut-lip of the small-diameter tool and the reference knife-edge is measured using the formula (1) and a known wavelength $\lambda$.

[Formula (1)]

$$x = 1.4303\lambda\sqrt{1+\left(\frac{2f}{w}\right)^2} \quad (1)$$

PRIOR ART DOCUMENT

Patent Document

Patent Document 1: Japanese Patent Laid-Open No. 2003-121123
Patent Document 2: Japanese Patent Laid-Open No. 2007-232489
Patent Document 3: Japanese Patent Laid-Open No. 2009-178818
Patent Document 4: Japanese Patent Laid-Open No. 2008-304292

SUMMARY OF THE INVENTION

Problems to be Solved by the Invention

In a fine machining process using a small-diameter tool, the tool is rotating at 10000 rpm or more, and if this rotation is stopped to measure the length of the gap between the tool and the workpiece, the machining efficiency becomes deteriorated. A position of the tool when the tool is stopped is different from a position thereof when the tool is rotating. Hence, such an on-machine and non-contact measurement technique has been desired that measures the tool while the tool is kept rotating at a high speed.

An object of the present invention is to establish a technique to directly measure a gap between a tool in a rotating state and a workpiece.

In order to realize direct measurement of the gap between the tip end of the cut-lip of the tool and the workpiece, the present invention utilizes an edge of the workpiece, so as to acquire the length of the gap between the tip end of the tool rotating at a high speed (150000 rpm, for example) and the workpiece.

Means for Solving the Problems

A method for measuring a length of a gap between a rotating tool and a workpiece using a laser beam according to the present invention includes generating a pulsed laser beam having a width greater than the gap between the rotating tool and the workpiece oppositely disposed to the rotating tool, and irradiating the gap with the generated pulsed laser beam whose optical axis is tilted relative to a plane of the workpiece. The pulsed laser beam has an oscillation pulse period that is one pulse per revolution or per an integer number of revolutions of the rotating tool, and is emitted in an identical angle range of the rotating tool during oscillation pulse ON durations. A light which is irradiated toward the gap and which is diffracted through the gap without being interrupted is detected on a light-receiving sensor, so as to measure a length of the gap.

A system for measuring a length of a gap between a rotating tool and a workpiece using a laser beam according to the present invention includes a laser source for generating a laser beam having a width greater than the gap between the rotating tool and the workpiece oppositely disposed to the rotating tool, and irradiating the gap with the generated laser beam whose optical axis is tilted relative to a plane of the workpiece, a controller for pulsing the laser beam to have an oscillation pulse period that is one pulse per revolution or per an integer number of revolutions of the rotating tool, so as to emit the pulsed laser beam in an identical angle range of the rotating tool during oscillation pulse ON durations, and a light receiving system for detecting on a light receiving sensor a light which is irradiated toward the gap and which is diffracted through the gap without being interrupted, so as to measure a length of the gap.

The light receiving sensor receives the pulsed laser beam emitted for a predetermined number of the periods, and detects an integrated diffracted light pattern during the predetermined number of the periods. The controller includes a laser oscillation pulse generating circuit for allowing a pulse phase adjustment of the laser beam, so as to generate the adjusted laser beam from the laser source, a motor-drive control circuit for rotating a motor for rotating the rotating tool synchronizedly with the laser oscillation pulse; and an electronic control shutter circuit for generating an ON-pulse signal equivalent to the pulsed laser beam for the predetermined number of the periods, so as to acquire a light receiving signal from the light-receiving sensor. The following condition is satisfied: an angle of diffraction $\theta+\arcsin(\lambda/x)>$a tilt angle of an optical axis $\omega>$the angle of diffraction $\theta$, where $\beta$ represents a coefficient of a diffraction order light, $\lambda$ represents a wavelength, x represents the length of the gap, and the angle of diffraction $\theta=\arcsin(\beta\lambda/x)$.

Effects of the Invention

The present invention realizes, in an ultra-precision machining center, a measurement of a length of a gap between a workpiece and a position of a tip end of a tool that is a high-speed rotating object rotating at hundreds of thousands of revolutions per minute with sub-micron accuracy. In the present invention, without using a reference knife-edge for conventionally use in the gap measurement method utilizing light diffraction, the gap between the tip end of the tool and the workpiece can be directly measured by using an edge of the workpiece as the reference edge with high accuracy. In addition, a laser beam is pulsed, thereby carrying out the measurement at a particular angular position of the tip end of the rotating tool.

MODE FOR CARRYING OUT THE INVENTION

Figures 1A, 1B, 1C:
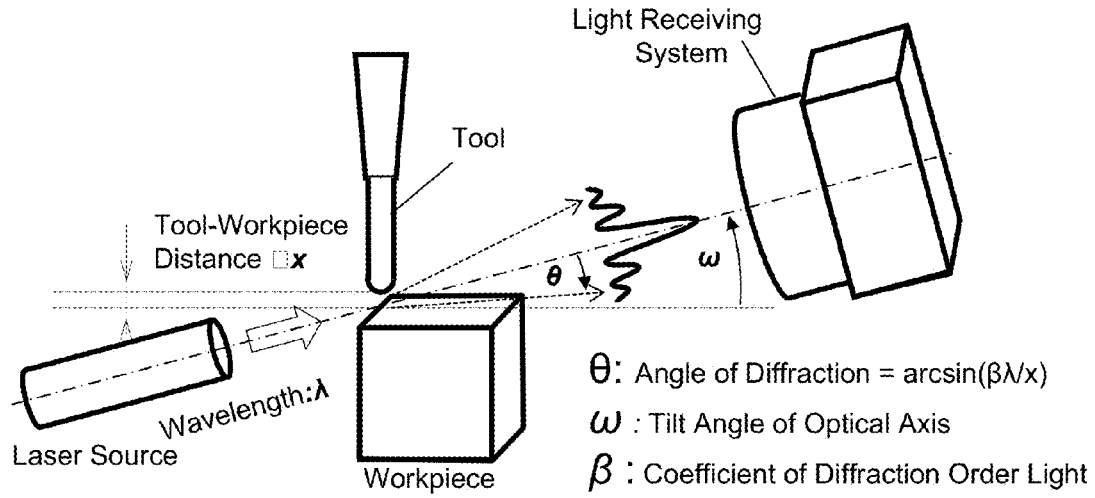
FIG. 1A is a schematic diagram explaining a measurement principle according to the present invention.
FIG. 1B is a table showing a relation between an angle of diffraction $\theta$ (degrees) and a tool-workpiece distance x.
FIG. 1C is a table showing a relation between each diffraction order light and its coefficient $\beta$.

The present invention will now be described with reference to illustrated examples. FIG. 1A is a schematic diagram explaining the measurement principle according to the present invention, FIG. 1B is a table showing a relation between a tool-workpiece distance x and an angle of diffraction $\theta$ (degrees), and FIG. 1C is a table showing a relation between a diffraction order light and its coefficient $\beta$. As shown in the drawing, a fine gap x between a tool of a measurement target and a workpiece is irradiated with the pulsed line laser beam in a flat sheet form, which has a width greater than this fine gap x, and is emitted from a laser source. At this time, in the present invention, in order to directly measure the length of the gap between the tip end of the tool and the workpiece, a measurement unit (the laser source and a light receiving system) is tilted relative to a plane of the workpiece (at a tilt angle of 15°, for example), and an edge of the workpiece is used as a reference knife-edge. The reason for the tilt of the optical axis relative to the plane of the workpiece is because the edge of the workpiece should be utilized.

Figure 9:
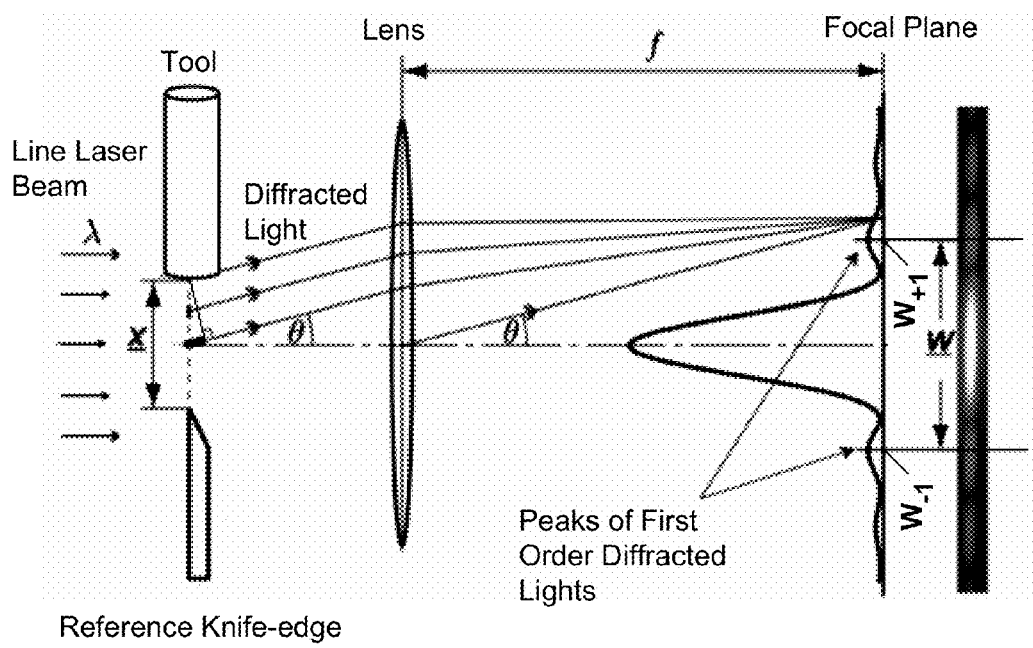
FIG. 9 is a drawing explaining a measurement principle of the optical diffraction method (see Patent Documents 2, 4).

In this manner, the laser beam is slantingly emitted from a semiconductor laser source, so that the diffracted light from the fine gap is acquired on the light receiving system (camera on the measurement unit). As explained with reference to FIG. 9, the fine gap x between the tool and the workpiece is irradiated with the line laser beam, so as to cause the light diffraction phenomenon. The diffracted light which has irradiated the gap x and has not been interrupted is concentrated on a Fourier transformer lens in the light receiving system, and at the same time, a diffraction pattern is acquired on a focal plane located at the focal distance f by using the camera or the like. From the acquired diffraction pattern, two peaks that are first-order diffracted lights are detected, and a distance between the peaks is measured as w, and then the fine gap x between the tool and the workpiece is measured using a known wavelength $\lambda$ and the formula (1).

In the present invention, an edge of the workpiece is used instead of using the conventional reference knife-edge. In order to receive the diffraction pattern diffracted from the fine gap x, the following condition should be satisfied: a tilt angle of the optical axis $\omega>$an angle of diffraction $\theta(=\arcsin(\beta\lambda/x))$. The upper limit of $\omega$ is defined to be "$\theta+\arcsin(\lambda/x)$" (angle of $\arcsin(\lambda/x)$ is equivalent to an angle of a "next-order diffraction light"). The reason for this is because a further tilt results in picking up a diffraction order light signal having a greater noise level. $\beta$ is a coefficient of the diffraction order light. Now, $\omega(>\theta)$ is defined to be 15°, for example. In order to pick up the first-order diffracted light to third-order diffracted light ($\beta=3.471$) whose intensity is 20% of that of the first-order diffracted light using a laser beam of $\lambda=650$ nm, for example, the angle of diffraction $\theta$ is 13° if the fine gap x is 10 microns.

Figure 2:
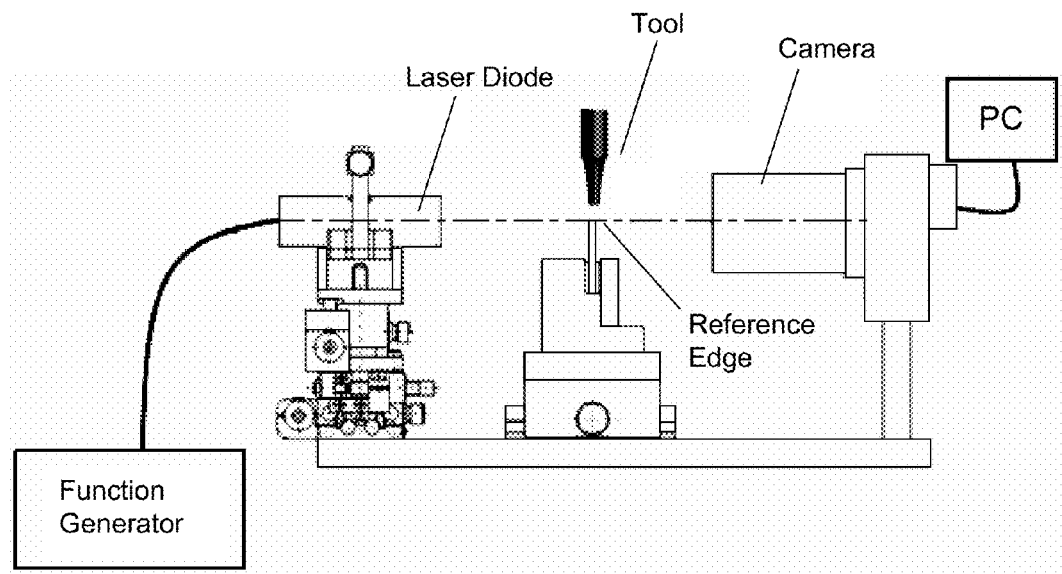
FIG. 2 is a drawing exemplifying a measurement device connected to a function generator.

In the present invention, the oscillated laser beam is pulsed at a high speed. FIG. 2 is a drawing exemplifying a measurement device connected to a function generator. For the purpose of measuring the length of the gap between the tip end of the tool in the rotating state and the workpiece, the laser source is connected to the function generator, and an input voltage is modulated in a square waveform so as to be pulsed. An interval between each pulse is fixed at a period of one revolution of the rotating tool. This configuration enables the irradiation with the laser beam at a same rotational position every time the pulse irradiation is carried out even if the tool is rotating. The laser beam is concentrated several times at the time of opening the shutter of the camera, so as to obtain sufficient light intensity. This method allows the rotating tool to be measured at an identical position in the same manner as measurement of the tool in a still state.

Figure 3:
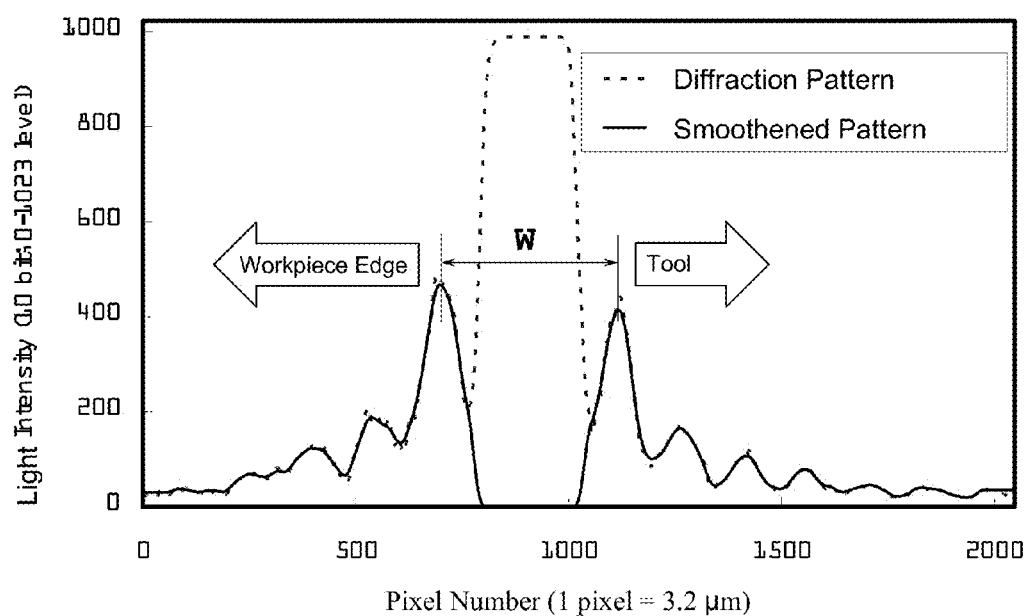
FIG. 3 is a drawing showing light diffraction intensity distributions (diffraction pattern) obtained from the measurement.

FIG. 3 is a drawing showing light diffraction intensity distributions (diffraction pattern) obtained from the measurement. Horizontal axis indicates pixel numbers of a CMOS camera, and the vertical axis indicates intensity of the light (10 bits; divided into 0 to 1023). The dashed line represents raw data of the diffraction pattern acquired on the camera. The solid line represents the diffraction pattern which is smoothened, and whose zero-order light at the center is removed. The detected center peak of the diffracted light pattern (zero-order light) is removed by image processing, but this may be removed by using a shield plate provided in front of the light-receiving sensor. The removal of the zero-order light is intended to reinforce an S/N (signal to noise) ratio of the first-order diffracted light required in the measurement. The distance w between the peaks of the first-order diffracted light that is to be substituted into the formula (1) is measured, thereby measuring the fine distance x, and finding the position of the tip end of the tool.

Figure 4:
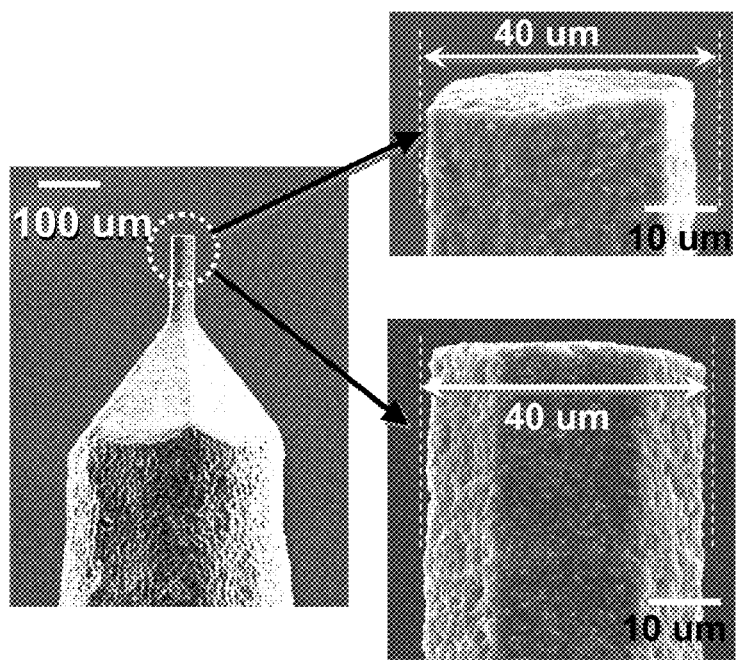
FIG. 4 shows an observation image by an electron microscope (SEM) that exemplifies a tip end of a common tool (see Patent Document 2).

FIG. 4 shows an observation image by an electron microscope (SEM) that exemplifies a tip end of a common tool (see Patent Document 2). The tool shown in the drawing is a micro tool made of polycrystalline diamond (PCD), and the blade of the tool is covered through its entire length with diamond abrasive grains. The exemplified tool has a regular hexagon cross section with a width across corner of a little less than 40 microns. According to the present invention, other tools having any shape such as a circular tool may also be used. As shown in the drawing, the tip end face of the tool is not a smooth surface in the sub-micron order. Hence, variation in the distance between the tool and the workpiece may occur depending on the rotational angle of the tool if the laser beam is slantingly emitted. In the present invention, the laser beam is so pulsed as to be emitted every time the tool comes to the same rotational angular position even if the tool is rotating.

Figure 5:
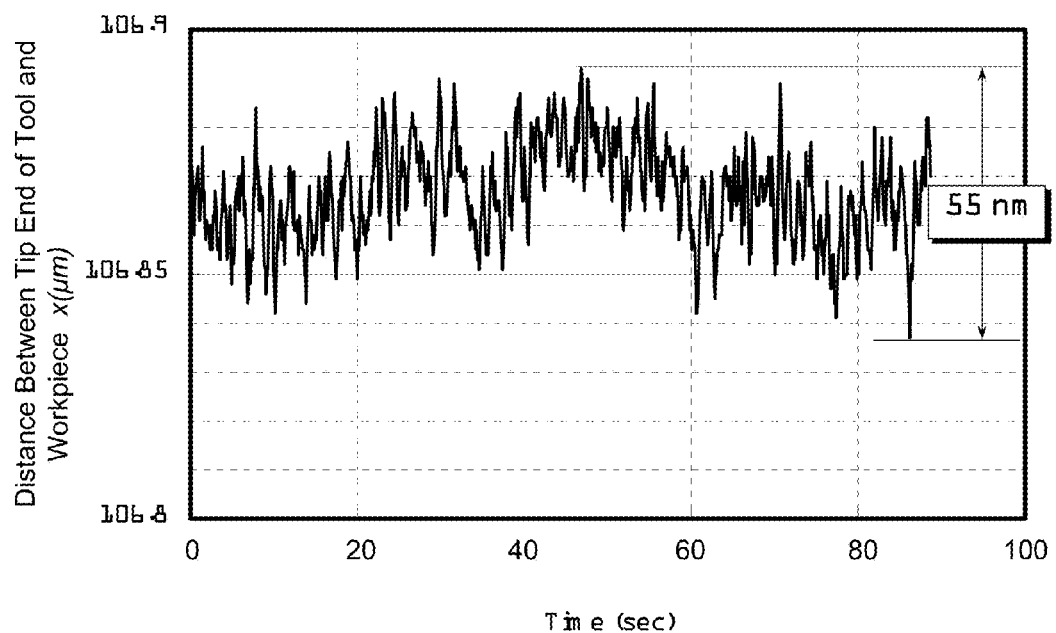
FIG. 5 is a graph showing a measurement result of the gap x between the tool in a rotating state and the workpiece.

FIG. 5 is a graph showing a measurement result of the gap x between the tool in a rotating state and the workpiece. The tool was rotated at a high speed (specification: 150000 rpm). The measurement result is represented after the measurement value relative to the rotating tool came into a steady state (0 sec). It is found that the gap between the tip end of the tool and the workpiece was measured with nonuniformity of 55 nm (approximately 0.06 microns).

Figure 6:
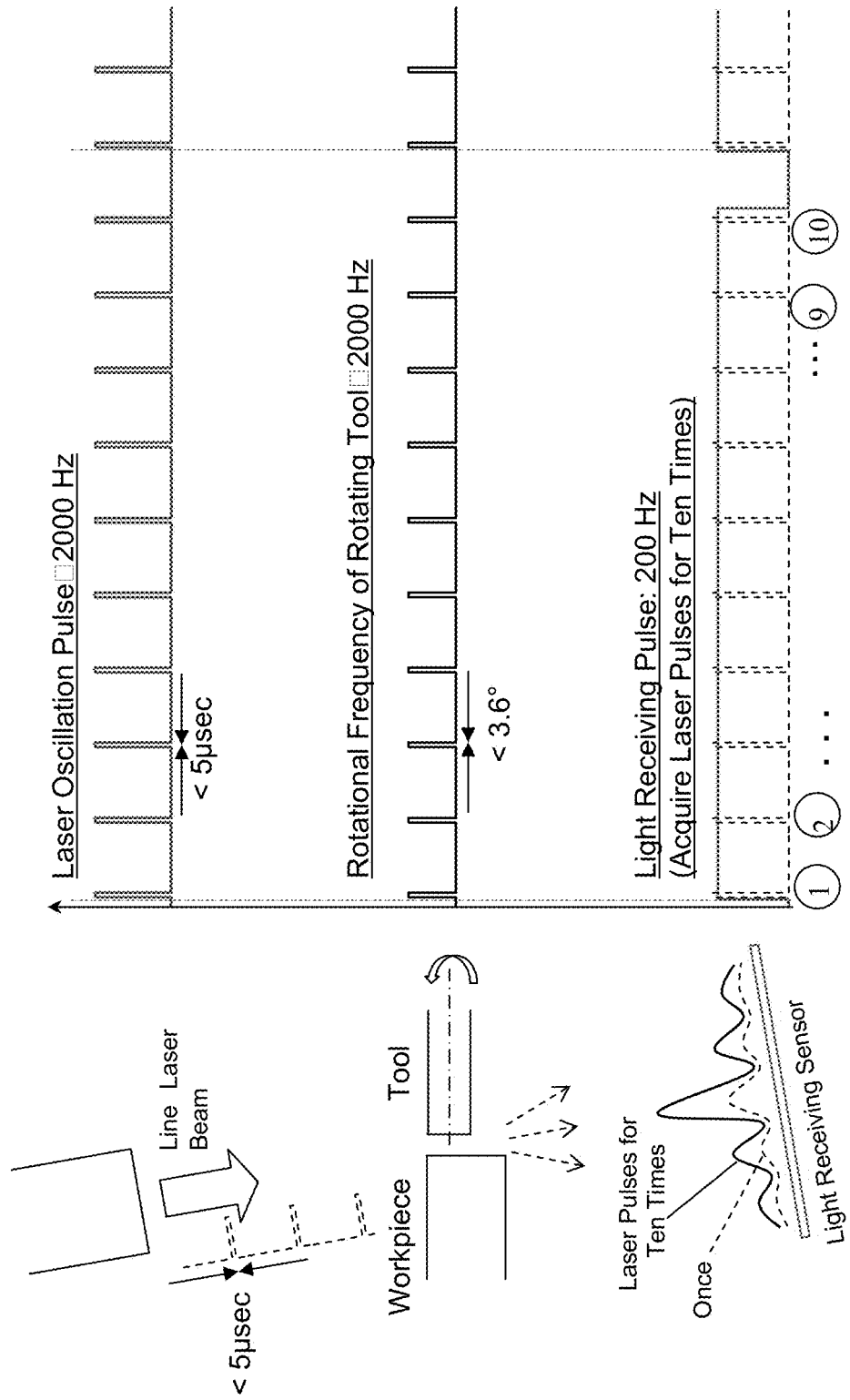
FIG. 6 is a drawing explaining the measurement principle by pulsing the oscillation laser beam at a high speed.

FIG. 6 is a drawing explaining the measurement principle by pulsing the oscillated laser beam at a high speed. The right upper graph represents oscillated pulses of the laser beam, the right middle graph represents the rotation period of the rotating tool (the pulse portion is irradiated with the laser beam), and the right lower graph represents the pulse waveform on a light receiver. According to the present invention, the rotating tool is irradiated with the line laser beam which is blinked synchronizedly with the rotation of the rotating tool, thereby enabling the measurement of the rotating tool that is rotating at a high speed (rotational frequency: N=120000 to 150000 $min^{-1}$).

As shown in the upper part of FIG. 6, the line laser beam of the laser source is blinked at a high speed synchronizedly with the rotation of the rotating tool. For example, if the rotational frequency of the rotating tool is 150000 $min^{-1}$ (2500 $sec^{-1}$), the laser beam is oscillated at 2500 Hz, and if the rotational frequency of the rotating tool is 120000 $min^{-1}$, the laser beam is oscillated at 2000 Hz. Specifically, the pulse period of the laser beam is one pulse per revolution of the rotating tool. This laser oscillation is set to be ON for 5 μsec (1/100 period), and is set to be OFF for the other time among one period of the oscillation pulse at 200 Hz (500 μsec).

As shown in the middle part of the FIG. 6, the laser beam is emitted only when a particular position of the rotating tool comes to the position opposing the edge of the workpiece. If the ON-pulse width of the laser beam is set at 5 μsec, the tip end of the rotating tool in a range of 3.6° is irradiated with the laser beam for this 5 μsec. This setting enables the identical position of the rotating tool to be measured once per revolution. In FIG. 6, it is exemplified that the laser oscillation is carried out at one pulse per revolution of the rotating tool, but the present invention is not limited to one pulse per revolution, and the irradiation with the laser beam at the identical position of the rotating tool may also be achieved by oscillating the laser beam at one pulse per integer number (one or plural) of the revolutions of the rotating tool.

As shown in the lower part of FIG. 6, if the light receiving pulse of the light-receiving sensor is set at 200 Hz, it is possible to receive the diffraction patterns for ten times at the identical position of the rotating tool on the light receiving sensor within one light receiving time duration. This measurement is equivalent to measurement of an integrated value of the received light for ten times, which secures sufficient intensity of light for measuring the diffraction patterns, so that the measurement of the rotating tool can be carried out while this tool is rotating at a high speed.

Figure 7:
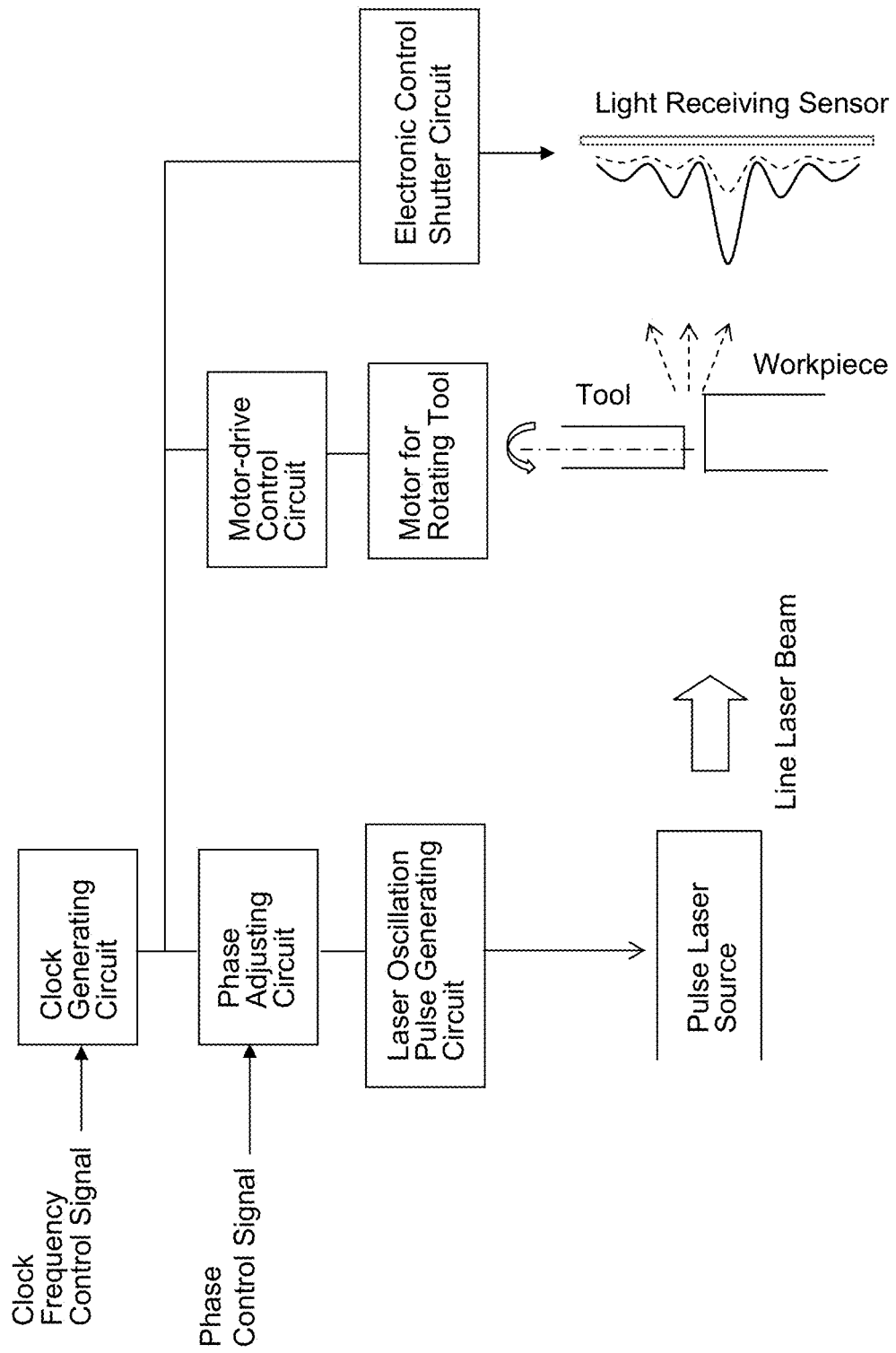
FIG. 7 is a drawing exemplifying a control circuit for the measurement device according to the present invention.

FIG. 7 is a drawing exemplifying a control circuit (function generator shown in FIG. 2) used for the measurement device according to the present invention. As shown in the drawing, a clock generating circuit generates a clock signal serving as a reference. The clock frequency can be varied by inputting a control signal. This clock signal is led to a phase adjusting circuit, a motor-drive control circuit and an electronic control shutter circuit. The phase adjusting circuit is configured to allow a pulse phase adjustment if a phase control signal is inputted to the phase adjusting circuit. The adjusted pulse is led to a laser oscillation pulse generating circuit, so as to generate the above described line laser beam from the pulse laser source.

The clock signal having a predetermined clock frequency is used for controlling through the motor-drive control circuit a motor for rotating the rotating tool so as to rotate synchronizedly with the laser oscillation pulse. Instead of providing the motor-drive control circuit, a rotational speed (rotational position) detector of the rotating tool may be provided so as to control the clock signal frequency based on an output signal from this detector, thereby synchronizing the oscillation pulse of the laser beam with the rotation of the rotating tool. If the rotating tool is rotating at a high speed at a constant frequency, the irradiated position may be controlled by simply shifting the phase of the laser pulse. The clock signal is led to the electronic control shutter circuit, so as to generate an ON-pulse signal equivalent to the laser pulses for ten times, for example, so as to receive the light receiving signal from the light-receiving sensor, as described above.

In this manner, a particular position in the range of 360° of the rotating tool that is rotating at a high speed can be irradiated with the pulsed laser beam. In addition to this, the phase is adjusted by the phase control circuit shown in the drawing so as to shift the timing of the oscillation pulse of the laser beam, thereby irradiating the target irradiated position with the laser beam, or changing this target irradiated position. For example, if the oscillation timing is shifted by 0.5 μsec (3.6 degrees in terms of the angle) every time the measurement is carried out, the target position can be shifted in the angular direction.

EXAMPLE

One example of the specification of the measurement device is as follow. This measurement device includes a laser source, a reference edge adjusting unit, a Fourier transformer lens (diffracted light acquiring focal distance f=75 mm), and a CMOS camera (1 pixel=3.2 microns). A laser beam irradiating unit includes a semiconductor laser source ($\lambda$=635 nm, beam width: approximately 18 microns). The fine gap between the tool rotating at a high speed and the workpiece is slantingly irradiated with the line laser beam, thereby measuring the length of the gap between the edge of the workpiece and the tip end of the tool while the workpiece and the rotating tool are mounted on the machine.

Figure 8:
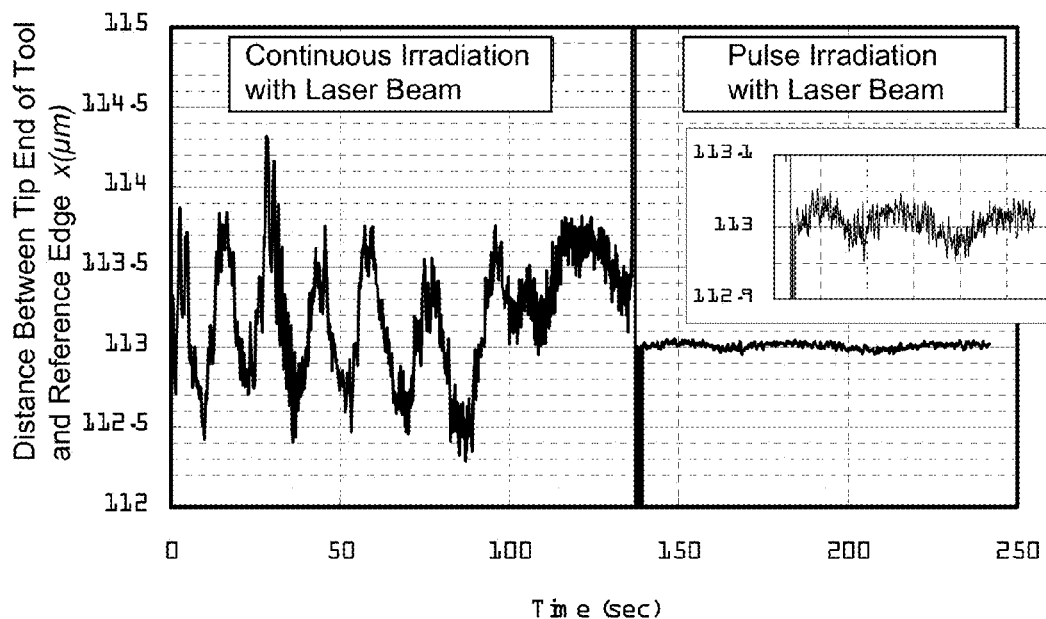
FIG. 8 is a drawing showing a result of the measurement of the gap between the workpiece reference edge and the tip end of the tool obtained based on the light diffraction pattern.

FIG. 8 is a drawing showing a result of the measurement on the gap between the workpiece reference edge and the tip end of the tool, which is obtained based on the light diffraction pattern. The horizontal axis represents the measurement time, and the vertical axis represents the measured gap between the tip end of the tool and the workpiece reference edge. This measurement result was obtained by measuring the small-diameter tool (ball end mill R=0.5 mm) while being rotated at an extremely high speed (150000 rpm). For the comparison, the continuous irradiation of the laser beam was used at the initial time of the measurement, and the gap between the tip end of the tool and the workpiece reference edge was measured with a relatively great variation of approximately 1.5 microns. 140 minutes after the measurement start, the continuous irradiation with the laser beam was switched to the pulse irradiation. Through this pulse irradiation, the gap between the tip end of the tool and the workpiece reference edge was measured with a variation of 0.1 microns or less, as shown in the enlarged drawing of FIG. 8. Accordingly, it is to be understood that, if the measurement is carried out while the tool is rotating, the measurement with high accuracy can be realized by pulsing the laser beam to be emitted.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The invention claimed is:

1. A method for measuring a length of a gap between a rotating tool and a workpiece by irradiating the gap with a laser beam, and measuring the length of the gap based on a diffracted pattern of diffracted light diffracted through the gap without being interrupted, the method comprising:
generating a pulsed laser beam having a width greater than the gap between the rotating tool and the workpiece oppositely disposed to the rotating tool;
irradiating the gap between an edge of the workpiece and the rotating tool with the pulsed laser beam, the gap resulting from tilting an optical axis of the pulsed laser beam relative to a plane of the workpiece;
emitting the pulsed laser beam in an identical angle range of the rotating tool during oscillation pulse ON durations, the laser beam having an oscillation pulse period that is one pulse per revolution or per an integer number of revolutions of the rotating tool; and
detecting on a light receiving sensor a light which is irradiated toward the gap and which is diffracted through the gap without being interrupted, so as to measure the length of the gap.

2. The method for measuring a length of a gap according to claim 1, wherein the light receiving sensor receives the pulsed laser beam emitted for a predetermined number of the periods, and detects an integrated diffracted light pattern during the predetermined number of the periods.

3. The method for measuring a length of a gap according to claim 1, wherein
a following condition is satisfied:

an angle of diffraction $\theta$+arcsin($\lambda$/x)>a tilt angle of an optical axis $\omega$>the angle of diffraction $\theta$, where
$\beta$ represents a coefficient of a diffraction order light, $\lambda$ represents a wavelength, x represents the length of the gap, and the angle of diffraction $\theta$=arcsin($\beta\lambda$/x).

4. A system for measuring a length of a gap between a rotating tool and a workpiece by irradiating the gap with a laser beam, and measuring the gap based on a diffracted pattern of a diffracted light diffracted through the gap without being interrupted, the system comprising:
a laser source for generating a laser beam having a width greater than the gap between the rotating tool and the workpiece oppositely disposed to the rotating tool, and irradiating the gap between an edge of the workpiece and the rotating tool with the generated laser beam, the gap resulting from tilting an optical axis of the generated laser beam relative to a plane of the workpiece;
a controller for pulsing the laser beam to have an oscillation pulse period that is one pulse per revolution or per an integer number of revolutions of the rotating tool, so as to emit the pulsed laser beam in an identical angle range of the rotating tool during oscillation pulse ON durations; and
a light receiving system for detecting on a light receiving sensor a light which is irradiated toward the gap and which is diffracted through the gap without being interrupted, so as to measure a length of the gap.

5. The system for measuring a length of a gap according to claim 4, wherein the light receiving sensor receives the pulsed laser beam emitted for a predetermined number of the periods, and detects an integrated diffracted light pattern during the predetermined number of the periods.

6. The system for measuring a length of a gap according to claim 5, wherein the controller comprises:
a laser oscillation pulse generating circuit for allowing a pulse phase adjustment of the laser beam, so as to generate the adjusted laser beam from the laser source;
a motor-drive control circuit for rotating a motor for rotating the rotating tool synchronizedly with the laser oscillation pulse; and
an electronic control shutter circuit for generating an ON-pulse signal equivalent to the pulsed laser beam for the predetermined number of the periods, so as to acquire a light receiving signal from the light-receiving sensor.

7. The system for measuring a length of a gap according to claim 4, wherein a following condition is satisfied:

an angle of diffraction $\theta$+arcsin($\lambda$/x)>a tilt angle of an optical axis $\omega$>the angle of diffraction $\theta$, where
$\beta$ represents a coefficient of a diffraction order light, $\lambda$ represents a wavelength, x represents the length of the gap, and the angle of diffraction $\theta$=arcsin($\beta\lambda$/x).

* * * * *